United States Patent
Chetuparambil et al.

(10) Patent No.: US 7,475,154 B2
(45) Date of Patent: Jan. 6, 2009

(54) SPLICING PROXIED WEB REQUESTS WITH CALLBACK FOR SUBSEQUENT REQUESTS

(75) Inventors: Madhu K. Chetuparambil, Raleigh, NC (US); Jakob L. Mickley, Raleigh, NC (US); Venkat Venkatsubra, Austin, TX (US); Ying Wang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/065,386

(22) Filed: Feb. 24, 2005

(65) Prior Publication Data
US 2006/0190609 A1 Aug. 24, 2006

(51) Int. Cl.
G06F 15/16 (2006.01)
(52) U.S. Cl. .............. 709/230; 709/203; 709/217; 709/227; 709/232; 709/237
(58) Field of Classification Search ........ 709/203, 709/217, 227–232, 237
See application file for complete search history.

(56) References Cited

U.S. PATENT DOCUMENTS 6,055,561 A * 4/2000 Feldman et al. ......... 709/200
6,798,739 B1 * 9/2004 Lee ..................... 370/216
7,139,268 B1 * 11/2006 Bhagwat et al. ......... 370/389
2001/0048683 A1 12/2001 Allan et al.
2002/0078135 A1 6/2002 Venkatsubra
2002/0120743 A1 8/2002 Shabtay et al.
2002/0138618 A1 9/2002 Szabo
2002/0188698 A1 12/2002 Jensen et al.
2003/0101273 A1 5/2003 Hensbergen
2003/0229713 A1 12/2003 Hensbergen et al.

OTHER PUBLICATIONS

Adhya et al., "Asymmetric Splice: Optimizing TCP Forwarder Performance for the HTTP/1.1 Protocol", Proceedings of the ICCC 2002, Aug. 12-14, 2002, Mumbai, India, pp. 239-251, vol. 1.

* cited by examiner

*Primary Examiner*—Phuoc H Nguyen
(74) *Attorney, Agent, or Firm*—A. Bruce Clay; Hoffman Warnick LLC

(57) ABSTRACT

The present invention provides a method, system, and computer program product for splicing proxied web requests with callback for subsequent requests. The method comprises: initiating by a proxy a Transmission Control Protocol (TCP) splice between first and second socket connections in order to service a request; and returning control of the first and second socket connections to the proxy in response to a completion event associated with the TCP splice.

3 Claims, 3 Drawing Sheets ated with the TCP splice has been generated; wherein the proxy can service a subsequent request on at least one of the first and second socket connections after regaining control; and wherein a same completion port is associated with all TCP splices initiated by the proxy.

SPLICING PROXIED WEB REQUESTS WITH CALLBACK FOR SUBSEQUENT REQUESTS

BACKGROUND OF THE INVENTION

1. Field of the Invention

The present invention generally relates to client-server systems. More particularly, the present invention provides a method, system, and computer program product for splicing proxied web requests with callback for subsequent requests.

2. Related Art

A proxy sits as an intermediary between clients and content servers. It provides features such as rules based routing of requests as well as security and caching. The development of Transmission Control Protocol (TCP) splicing increased the performance of proxies by reducing resource utilization in terms of context switches and buffer copies between kernel to user and again from user to kernel, inherent in a typical proxy operation.

In its current form, a TCP splice call is made only once for associating an inbound and outbound socket to each other. This allows efficient utilization of resources. However, the primary drawback of this approach is the loss of control once the splice method is called. Currently, the proxy completely releases socket control, thereby losing the ability to make routing decisions on subsequent requests. This limits the use of splicing to tunneled traffic where the server endpoint does not change once the connection is established. The splice is automatically destroyed when either connection is closed.

Large responses and HyperText Transfer Protocol (HTTP) 1.1 keep-alive requests are commonly handled by the proxy. The original TCP splicing mechanism does not take into account the persistent nature of these HTTP connections and the possibility of routing requests on a HTTP 1.1 connection to different content servers. With the advent of new streaming media and teaming applications, it is more common to see long lived responses from a content server. Although TCP splicing can boost performance in terms of resource utilization and better response times, it may actually degrade proxy performance for short lived connections.

SUMMARY OF THE INVENTION

In general, the present invention provides a method, system, and computer program product for splicing proxied web requests with callback for subsequent requests.

The present invention provides an asynchronous Transmission Control Protocol (TCP) splicing mechanism that changes the scope of a TCP splice from the lifetime of either socket connection to the amount of data transferred through the splice. This allows the generic advantages of splicing to be applied to regular HTTP traffic through the proxy. The present invention modifies the TCP splicing mechanism by setting up the splice between the inbound and outbound socket connections for a specified amount of data or a timeout value—which ever occurs first. When the splice is terminated, a completion event containing the status of the splice is generated and the proxy is notified. The proxy thereby regains control of the client socket and can service a subsequent request on the socket. This would allow the proxy, for example, to reroute subsequent requests to more efficiently use available content servers.

A first aspect of the present invention is directed to a method for Transmission Control Protocol (TCP) splicing, comprising: initiating by a proxy a TCP splice between first and second socket connections in order to service a request; returning control of the first and second socket connections to the proxy in response to a completion event associated with the TCP splice; generating the completion event in response to a transfer of a specified amount of data between the first and second socket connections during the TCP splice, in response to an expiration of a timeout value during the TCP splice, or in response to an occurrence of an exception during the TCP splice; associating a completion port with the TCP splice initiated by the proxy; associating a unique completion key with each TCP splice initiated by the proxy, placing the TCP splice in a splice queue with all other pending TCP splices initiated by the proxy, and generating a completion event upon completion of any of the TCP splices in the splice queue; identifying the completed TCP splice using its associated completion key; and monitoring the completion port to determine whether the completion event associated with the TCP splice has been generated; wherein the proxy can service a subsequent request on at least one of the first and second socket connections after regaining control; and wherein a same completion port is associated with all TCP splices initiated by the proxy.

A second aspect of the present invention is directed to a system for Transmission Control Protocol (TCP) splicing, comprising: at least one computer, including: a system for initiating by a proxy a TCP splice between first and second socket connections in order to service a request; a system for returning control of the first and second socket connections to the proxy in response to a completion event associated with the TCP splice; a system for generating the completion event in response to a transfer of a specified amount of data between the first and second socket connections during the TCP splice, in response to an expiration of a timeout value during the TCP splice, or in response to an occurrence of an exception during the TCP splice; a system for associating a completion port with the TCP splice initiated by the proxy; a system for associating a unique completion key with each TCP splice initiated by the proxy, placing the TCP splice in a splice queue with all other pending TCP splices initiated by the proxy, and generating a completion event upon completion of any of the TCP splices in the splice queue; a system for identifying the completed TCP splice using its associated completion key; and a system for monitoring the completion port to determine whether the completion event associated with the TCP splice has been generated; wherein the proxy can service a subsequent request on at least one of the first and second socket connections after regaining control; and wherein a same completion port is associated with all TCP splices initiated by the proxy.

A third aspect of the present invention is directed to a program product stored on a computer readable medium for Transmission Control Protocol (TCP) splicing, the computer readable medium comprising program code for: initiating by a proxy a TCP splice between first and second socket connections in order to service a request; returning control of the first and second socket connections to the proxy in response to a completion event associated with the TCP splice; generating the completion event in response to a transfer of a specified amount of data between the first and second socket connections during the TCP splice, in response to an expiration of a timeout value during the TCP splice, or in response to an occurrence of an exception during the TCP splice; associating a completion port with the TCP splice initiated by the proxy; associating a unique completion key with each TCP splice initiated by the proxy, placing the TCP splice in a splice queue with all other pending TCP splices initiated by the proxy, and generating a completion event upon completion of any of the TCP splices in the splice queue; identifying the completed TCP splice using its associated completion key; and monitoring the completion port to determine whether the completion event associated with the TCP splice has been generated; wherein the proxy can service a subsequent request on at least one of the first and second socket connections after regaining control; and wherein a same completion port is associated with all TCP splices initiated by the proxy.

BRIEF DESCRIPTION OF THE DRAWINGS

These and other features of this invention will be more readily understood from the following detailed description of the various aspects of the invention taken in conjunction with the accompanying drawings in which.

Figure 1:
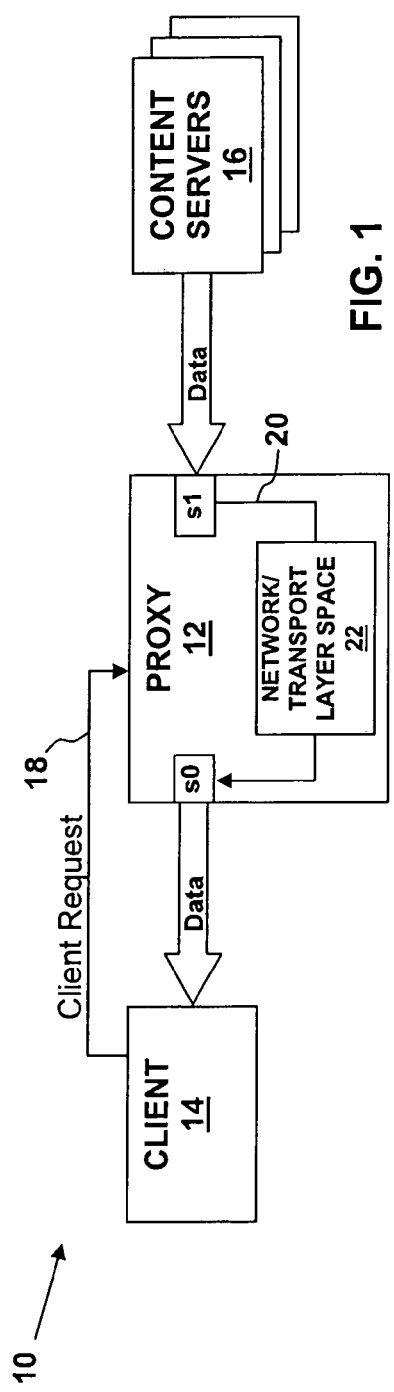
FIG. 1 depicts a data flow in a typical proxy scenario, wherein a proxy sends data from a content server to a client using a TCP splice.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As mentioned above, the present invention provides an asynchronous Transmission Control Protocol (TCP) splicing mechanism that changes the scope of a TCP splice from the lifetime of either socket connection to the amount of data transferred through the splice. This allows the generic advantages of splicing to be applied to regular HTTP traffic through the proxy. The present invention modifies the TCP splicing mechanism by setting up the splice between the inbound and outbound socket connections for a specified amount of data or a timeout value—which ever occurs first. When the splice is terminated, a completion event containing the status of the splice is generated and the proxy is notified. The proxy thereby regains control of the client socket and can service a subsequent request on the socket. This would allow the proxy, for example, to reroute subsequent requests to more efficiently use available content servers.

The data flow in a typical proxy scenario 10 in which a proxy 12 sends data to a client 14 from one of a plurality of content servers 16 in response to a client request 18 is illustrated in FIG. 1 (an analogous scenario may exist for the transfer of data from the client 14 to a content server 16). As known in the art, when a TCP splice 20 is established, data passes from the content server 16 to the client 14 through socket connections (e.g., s0, s1) via the network/transport layer space 22 of the proxy 12.

Figure 2:
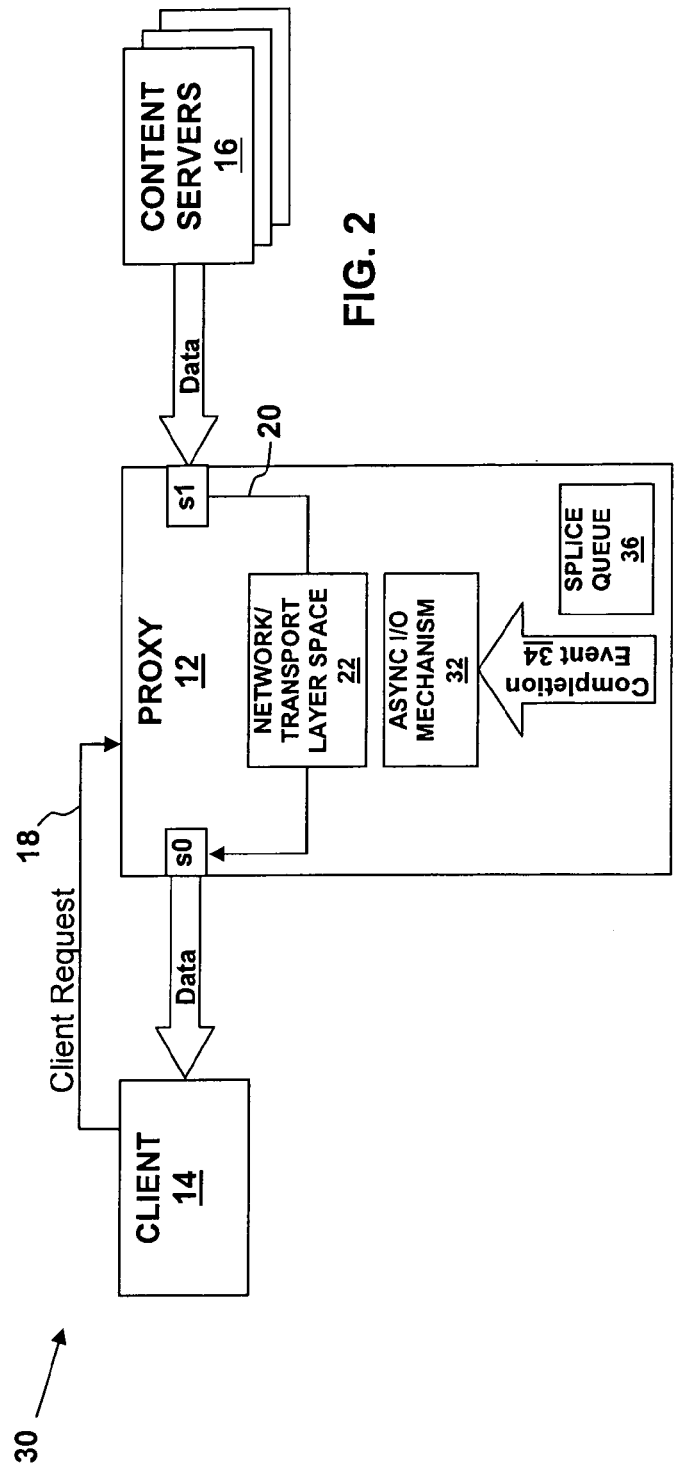
FIG. 2 depicts the proxy scenario of FIG. 1 modified in accordance with an embodiment of the present invention, wherein an asynchronous I/O mechanism is provided for returning control to the proxy in response to the occurrence of a completion event.

The present invention provides a modified proxy scenario 30 as shown in FIG. 2. In particular, the present invention provides an asynchronous I/O mechanism 32 for returning control to the proxy 12 in response to the occurrence of a completion event 34. A completion event 34 may comprise, for example:

(A) The expiration of a timeout value specified during the setup of the splice 20. If the splice 20 does not complete within a predetermined period of time (e.g., 10 minutes), it is assumed that the splice 20 will never complete and that the proxy 12 needs to take corrective action.

(B) A specified amount of data has been transferred through the spliced sockets.

(C) An exception occurs (e.g., a socket failure occurs on one of the two sockets involved in the splice 20).

An illustrative example of the data flow provided by an embodiment of the present invention is described below:

(1) Client 14 sends an HTTP GET request to proxy 12 (e.g., GET /webconf/keepmeupdatedrooma).

(2) Proxy 12 receives the GET request from client 14, determines (e.g., based on established rules) whether the GET request is in a long-lived response category, and determines which content server 16 should service the request. Socket connection s0 accepted from client 14 inbound request.

(3) Proxy 12 issues request to appropriate content server 16 and socket connection s1 created. Proxy 12 receives a response from content server 16 regarding the amount of data to be transferred (e.g., 750 MB). Based on the amount of data to be transferred (and/or other established rules), proxy 12 determines that this request is a candidate for splicing.

(4) TCP splice 20 is called by proxy 12: splice(ioCompletionPort, size, timeout, s0, s1, ioCompletionKey), where ioCompletionPort represents a completion port used by all splices, size represents the amount of data to be written (e.g., in bytes), timeout represents the amount of inactivity (e.g., in seconds, minutes, etc.) before timing out either socket connection, s0 and s1 represent the socket connections between client 14 and proxy 12, and proxy 12 and content server 16, respectively, and completion key represents a unique value for tracking the TCP splice 20.

(5) Data sent from content server 16 to client 14 via TCP splice 20.

(6) On completion of data transfer, TCP splice 20 is dismantled and a completion event is generated which the proxy 12 receives through a GetQueuedCompletionStatus system call. The proxy 12 matches the completion key and logs the amount of data transferred.

(7) Proxy 12 is now ready to service the next request on the client socket connection s0, which it does via the usual connection management mechanism.

The above-described method allows the proxy 12 to log both events and utilize TCP splicing. In addition, the proxy 12 can reuse the same client socket connection s0 without forcing the client 14 to start a new request.

Figure 3:
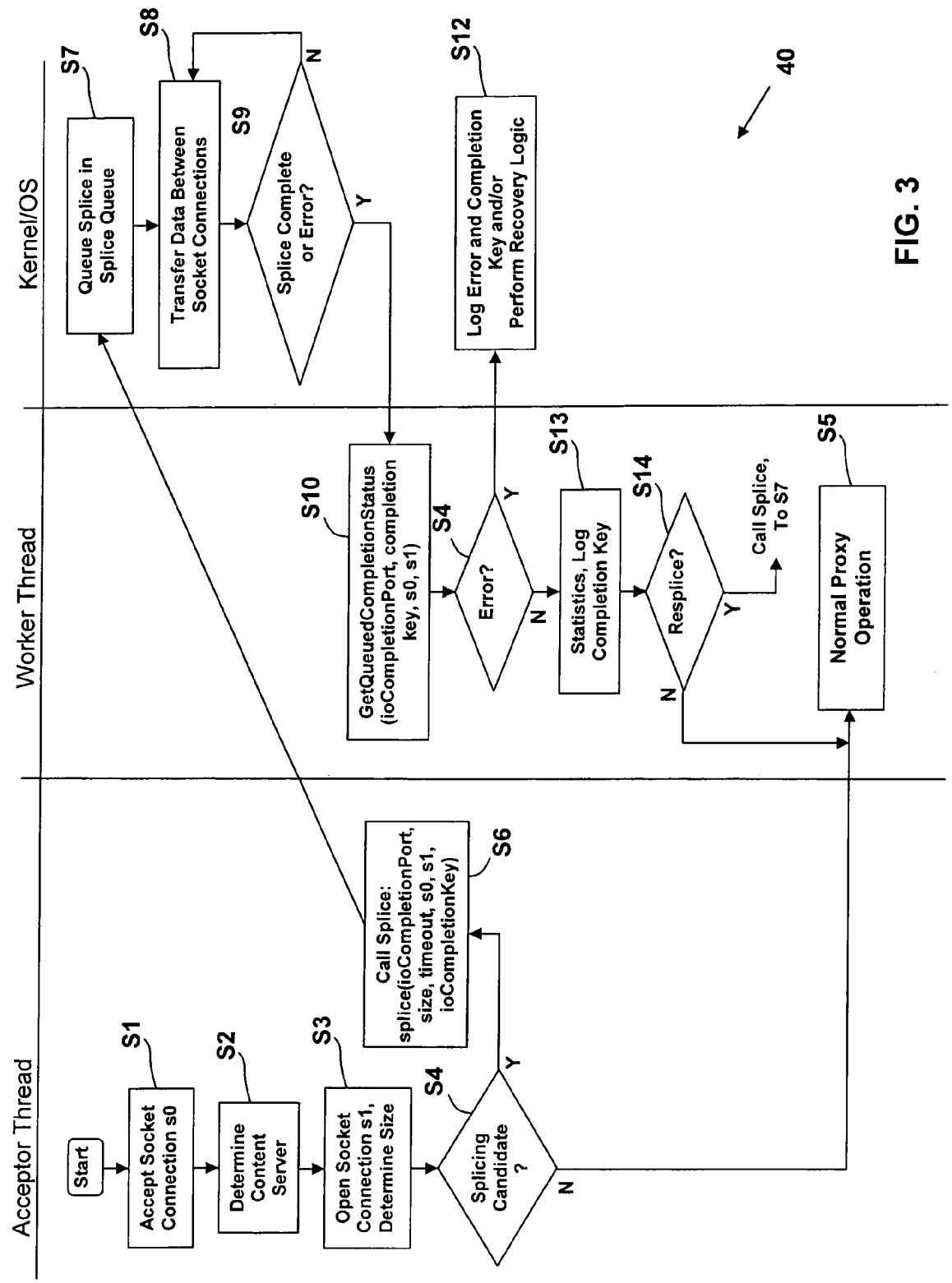
FIG. 3 depicts a flow diagram in accordance with an embodiment of the present invention.

A more detailed description of the above-described process is provided below with reference to the flow diagram 40 depicted in FIG. 3 and the modified proxy scenario 30 depicted in FIG. 2. As shown, flow diagram 40 comprises steps performed/provided by different levels of proxy 12, including acceptor threads, worker threads, and kernel/OS. It is assumed that the reader has an understanding of proxies commensurate with one skilled in the art. Therefore, a detailed description of the operation of proxies will not be provided herein.

In step S1, a socket connection s0 is accepted from client 14 in response to a client request 18. In step S2, after the socket connection s0 has been handled and the proxy 12 understands what the request was intended for (e.g., an HTTP GET request), the proxy 12 determines (e.g., using mapping rules) which content server 16 should service the request. In step S3, the proxy 12 opens a socket connection s1 to the appropriate content server 16 and determines the amount of data to be transferred.

In step S4, the candidacy of the request for TCP splicing is determined. This can be based, for example, on characteristics determined when requesting data from a content server (e.g., amount of data to be transferred determined by HTTP response on s1) or based on detection of a predefined pattern specified by the user (e.g., such as always forcing splice based on inbound Uniform Resource Identifier (URI) pattern). Quality of service for a particular user or application could also be used to determine the candidacy for TCP splicing. If the request is not a candidate for TCP splicing, flow passes to step S5 where the request is handled by proxy 12 in a normal fashion. If the request received from client 14 is a candidate for TCP splicing, however, then a TCP splice 20 is called by proxy 12 in step S6 as follows: splice(ioCompletionPort, size, timeout, s0, s1, ioCompletionKey), where ioCompletionPort represents a completion port used by all splices, size represents the amount of data to be written (e.g., in bytes), timeout represents the amount of inactivity (e.g., in seconds, minutes, etc.) before timing out either socket connection, s0 and s1 represent the socket connections between client 14 and proxy 12, and proxy 12 and content server 16, respectively, and completion key represents a unique value for tracking the TCP splice 20. Responsibility for the TCP splice 20 is then transferred to the kernel/OS level.

In step S7, the TCP splice 20 is placed in a splice queue 36 with all other pending TCP splices 20. In step S8, the kernel/OS takes over the processing of the data transfer between the socket connections s0 and s1 associated with the TCP splice 20. The TCP splices 20 in the splice queue 36 can be processed in a predetermined order (e.g., based on order of receipt, size, etc.) or in a parallel manner (?). Meanwhile, worker threads 44 are free to handle other processing.

Once the kernel/OS has finished transferring all data in a TCP splice 20 (i.e., any of the TCP splices 20 queued in the splice queue 36) (step S9), or upon an error (e.g., timeout), that TCP splice 20 is dismantled, and a completion event 34 is generated (step S10) and received by an available worker thread through a GetQueuedCompletionStatus system call: GetQueuedCompletionStatus(ioCompletionPort, completion key, s0, s1). To this extent, the completion port is "called back" with the completion key. If an error occurred (step S11) during the TCP splice 20, flow passes to step S12, where the error and the completion key corresponding to the TCP splice 20 are logged and/or error recovery is performed. If an error did not occur (step S11) during the TCP splice 20, flow passes to step S13, where the completion key corresponding to the TCP splice 20 is logged and statistics are generated. In step S14, it is determined whether there should be another TCP splice 20 with an existing socket connection to the same or different content server 16. If so, the TCP splice 20 can be reissued or a new TCP splice 20 can be established (this would require another splice(ioCompletionPort, size, timeout, s0, s1, ioCompletionKey) call). This would then offload the worker thread again for the duration of the data transfer during the TCP splice 20. If not, the worker thread can be dispatched to do other work (step S5).

Figure 4:
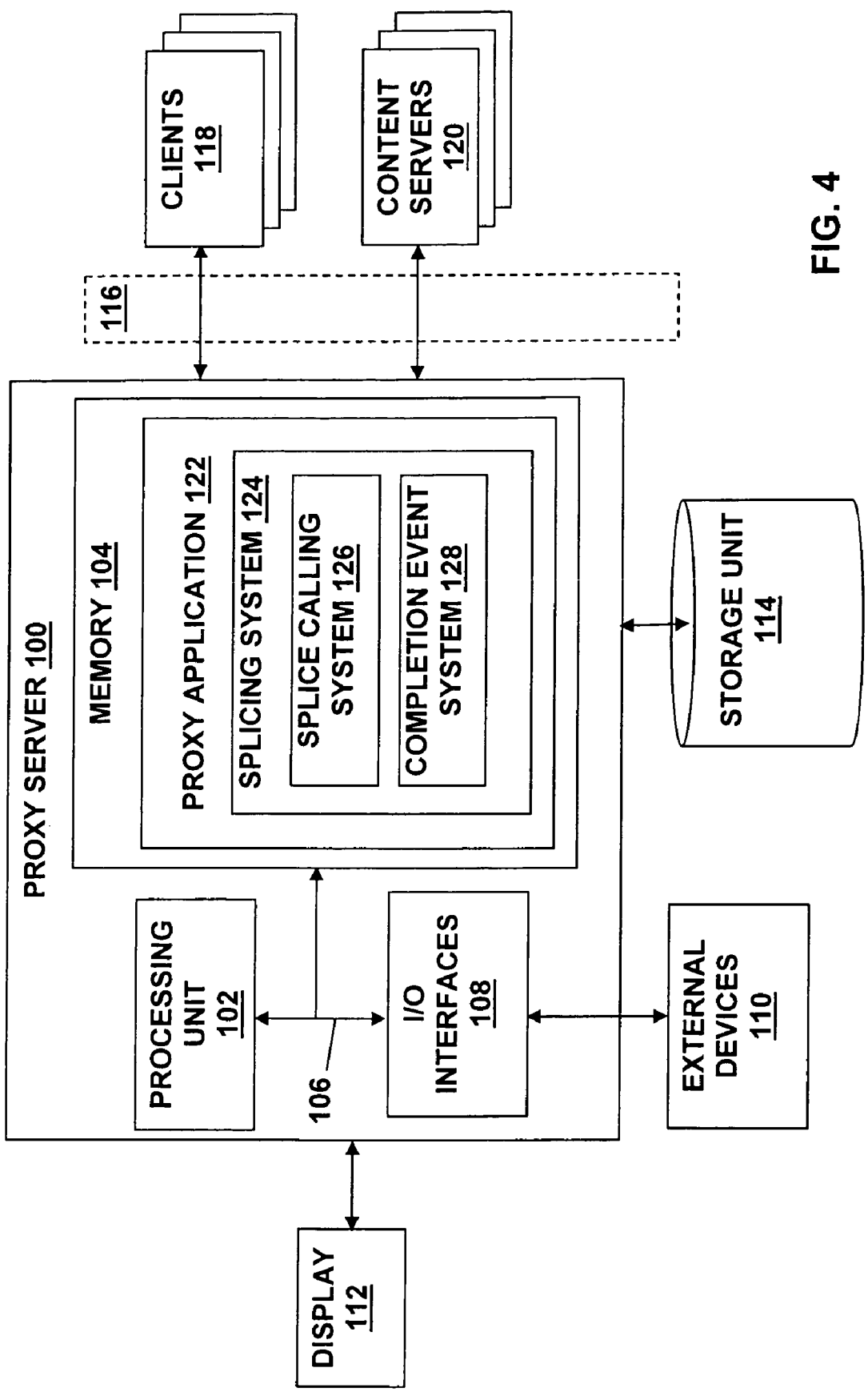
FIG. 4 depicts a computer system for implementing the present invention.

A proxy server 100 for splicing proxied web requests with callback for subsequent requests in accordance with an embodiment of the present invention is illustrated in FIG. 4. As shown, proxy server 100 generally includes a processing unit 102, memory 104, bus 106, input/output (I/O) interfaces 108, external devices/resources 110, and storage unit 112. Processing unit 102 may comprise a single processing unit, or may be distributed across one or more processing units in one or more locations. Memory 104 may comprise any known type of data storage and/or transmission media, including magnetic media, optical media, random access memory (RAM), read-only memory (ROM), etc. Moreover, similar to processing unit 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, handheld device, keyboard, mouse, voice recognition system, speech output system, printer, monitor/display (e.g., display 112), facsimile, pager, etc.

Bus 106 provides a communication link between each of the components in proxy server 100, and likewise may comprise any known type of transmission link, including electrical, optical, wireless, etc. In addition, although not shown, additional components, such as cache memory, communication systems, system software, etc., may be incorporated into proxy server 100.

Data used in the practice of the present invention can be stored locally to proxy server 100, for example, in storage unit 114, and/or may be provided to proxy server 100 over a network 116. Storage unit 114 can be any system capable of providing storage for data and information under the present invention. As such, storage unit 114 may reside at a single physical location, comprising one or more types of data storage, or may be distributed across a plurality of physical systems in various forms. In another embodiment, storage unit 114 may be distributed across, for example, a local area network (LAN), wide area network (WAN) or a storage area network (SAN) (not shown).

Network 116 is intended to represent any type of network over which data can be transmitted. For example, network 116 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. One or more clients 118 and content servers 120 may be connected to proxy server 100 via network 116. Each client device 118 and content server 120 may comprise components similar to those described above with regard to proxy server 100.

Shown in memory 104 as a computer program product is a proxy application 122 for performing proxy operations. Proxy application 122 includes a splicing system 124 for splicing proxied web requests with callback in accordance with an embodiment of the present invention. Splicing system 124 includes a splice calling system 126 for calling a TCP splice: splice(ioCompletionPort, size, timeout, s0, s1, ioCompletionKey), and a completion event system 128 for generating a completion event which is detected via a GetQueuedCompletionStatus system call. Proxy application 122 also includes systems (not shown) for performing other various processes described above with regard to the present invention.

It should be appreciated that the teachings of the present invention can be offered as a business method on a subscription or fee basis. For example, proxy server 100 could be created, maintained, supported, and/or deployed by a service provider that offers the functions described herein for customers. That is, a service provider could be used to provide Transmission Control Protocol (TCP) splicing as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for Transmission Control Protocol (TCP) splicing, comprising:
    initiating by a proxy a TCP splice between first and second socket connections in order to service a request;
    returning control of the first and second socket connections to the proxy in response to a completion event associated with the TCP splice;
    generating the completion event in response to a transfer of a specified amount of data between the first and second socket connections during the TCP splice, in response to an expiration of a timeout value during the TCP splice, or in response to an occurrence of an exception during the TCP splice;
    associating a completion port with the TCP splice initiated by the proxy;
    associating a unique completion key with each TCP splice initiated by the proxy, placing the TCP splice in a splice queue with all other pending TCP splices initiated by the proxy, and generating a completion event upon completion of any of the TCP splices in the splice queue;
    identifying the completed TCP splice using its associated completion key; and
    monitoring the completion port to determine whether the completion event associated with the TCP splice has been generated;
    wherein the proxy can service a subsequent request on at least one of the first and second socket connections after regaining control; and
    wherein a same completion port is associated with all TCP splices initiated by the proxy.

2. A system for Transmission Control Protocol (TCP) splicing, comprising:
    at least one computer, including:
    a system for initiating by a proxy a TCP splice between first and second socket connections in order to service a request;
    a system for returning control of the first and second socket connections to the proxy in response to a completion event associated with the TCP splice;
    a system for generating the completion event in response to a transfer of a specified amount of data between the first and second socket connections during the TCP splice, in response to an expiration of a timeout value during the TCP splice, or in response to an occurrence of an exception during the TCP splice;
    a system for associating a completion port with the TCP splice initiated by the proxy;
    a system for associating a unique completion key with each TCP splice initiated by the proxy, placing the TCP splice in a splice queue with all other pending TCP splices initiated by the proxy, and generating a completion event upon completion of any of the TCP splices in the splice queue;
    a system for identifying the completed TCP splice using its associated completion key; and
    a system for monitoring the completion port to determine whether the completion event associated with the TCP splice has been generated;
    wherein the proxy can service a subsequent request on at least one of the first and second socket connections after regaining control; and
    wherein a same completion port is associated with all TCP splices initiated by the proxy.

3. A program product stored on a computer readable medium for Transmission Control Protocol (TCP) splicing, the computer readable medium comprising program code for:
    initiating by a proxy a TCP splice between first and second socket connections in order to service a request;
    returning control of the first and second socket connections to the proxy in response to a completion event associated with the TCP splice;
    generating the completion event in response to a transfer of a specified amount of data between the first and second socket connections during the TCP splice, in response to an expiration of a timeout value during the TCP splice, or in response to an occurrence of an exception during the TCP splice;
    associating a completion port with the TCP splice initiated by the proxy;
    associating a unique completion key with each TCP splice initiated by the proxy, placing the TCP splice in a splice queue with all other pending TCP splices initiated by the proxy, and generating a completion event upon completion of any of the TCP splices in the splice queue;
    identifying the completed TCP splice using its associated completion key; and
    monitoring the completion port to determine whether the completion event associated with the TCP splice has been generated;
    wherein the proxy can service a subsequent request on at least one of the first and second socket connections after regaining control; and
    wherein a same completion port is associated with all TCP splices initiated by the proxy.

* * * * *